(12) United States Patent
Doepke (10) Patent No.: US 9,584,733 B2
(45) Date of Patent: Feb. 28, 2017

(54) HIGH DYNAMIC RANGE TRANSITION

(75) Inventor: Frank Doepke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 462 days.

(21) Appl. No.: 12/895,637

(22) Filed: Sep. 30, 2010

(65) Prior Publication Data

US 2012/0081579 A1 Apr. 5, 2012

(51) Int. Cl.
| H04N 5/225 | (2006.01) |
| H04N 5/235 | (2006.01) |
| H04N 5/232 | (2006.01) |
| H04N 9/68 | (2006.01) |

(52) U.S. Cl.
CPC ........... *H04N 5/2355* (2013.01); *H04N 5/225* (2013.01); *H04N 5/23245* (2013.01); *H04N 9/68* (2013.01)

(58) Field of Classification Search
CPC .... H04N 5/235–5/243; H04N 5/23245; H04N 5/2355; H04N 5/225; H04N 9/68; G06T 5/40
See application file for complete search history.

(56) References Cited

U.S. PATENT DOCUMENTS

| 5,101,276 | A | | 3/1992 | Ohta |
| 5,194,960 | A | * | 3/1993 | Ota ....................... H04N 5/2351 348/224.1 |
| 5,929,908 | A | | 7/1999 | Takahashi |
| 6,204,881 | B1 | | 3/2001 | Ikeda et al. |
| 6,496,226 | B2 | | 12/2002 | Takahashi et al. |
| 7,352,398 | B2 | | 4/2008 | Sano |
| 8,194,993 | B1 | * | 6/2012 | Chen et al. .................... 382/254 |
| 2004/0119876 | A1 | * | 6/2004 | Ohmori et al. ................ 348/362 |
| 2004/0141075 | A1 | * | 7/2004 | Xu ........................ H04N 5/2351 348/296 |
| 2006/0192879 | A1 | | 8/2006 | Hisamatsu |
| 2006/0204121 | A1 | * | 9/2006 | Bryll ..................... G06K 9/6288 382/255 |
| 2006/0250515 | A1 | * | 11/2006 | Koseki ............... H04N 5/23293 348/362 |
| 2006/0268151 | A1 | * | 11/2006 | Yamashita .................... 348/362 |

(Continued)

FOREIGN PATENT DOCUMENTS

| CN | 101365071 A | 2/2009 |
| EP | 0987885 A2 | 3/2000 |

(Continued)

OTHER PUBLICATIONS

Georgiev, Todor, Andrew Lumsdaine and Sergio Goma. "High Dynamic Range Image Capture with Plenoptic 2.0 Camera." Optical Society of America. 2010. pp. 1-3.

(Continued)

*Primary Examiner* — Abdelaaziz Tissire
(74) *Attorney, Agent, or Firm* — Blank Rome LLP (57) ABSTRACT

In personal electronic devices including digital imaging capability, methods, devices and computer readable media are described for determining when image capture operations may benefit from using high dynamic range imaging (HDRI) operations. In general, techniques are disclosed for analyzing an image's luminosity and/or color/tonal histograms to automatically determine when HDRI operations can benefit scene capture. If the determination that HDRI operations can improve scene capture, the user is so notified.

19 Claims, 5 Drawing Sheets

(56) References Cited

U.S. PATENT DOCUMENTS

| | | | |
|---|---|---|---|
| 2007/0092137 A1* | 4/2007 | Zhao | G06T 3/40 382/169 |
| 2007/0206108 A1* | 9/2007 | Nozawa | H04N 1/6086 348/333.01 |
| 2008/0130994 A1* | 6/2008 | Lin | 382/169 |
| 2008/0158268 A1* | 7/2008 | Hui | G09G 3/2022 345/691 |
| 2008/0297596 A1* | 12/2008 | Inomata | G06T 5/50 348/80 |
| 2009/0086074 A1* | 4/2009 | Li | H04N 5/23245 348/308 |
| 2009/0102945 A1* | 4/2009 | Chen | 348/229.1 |
| 2009/0251591 A1* | 10/2009 | Whitham | H04N 5/2356 348/362 |
| 2010/0201848 A1* | 8/2010 | Fukui | H04N 5/23219 348/234 |
| 2010/0259636 A1* | 10/2010 | Tzur | H04N 5/3355 348/222.1 |
| 2010/0328489 A1* | 12/2010 | Bauer et al. | 348/229.1 |
| 2010/0329557 A1* | 12/2010 | Wang | G06K 9/6223 382/171 |
| 2011/0090365 A1* | 4/2011 | Cha | H04N 5/2353 348/229.1 |
| 2011/0096085 A1* | 4/2011 | Cha | G06T 5/009 345/589 |
| 2011/0149111 A1* | 6/2011 | Prentice et al. | 348/229.1 |
| 2011/0292246 A1* | 12/2011 | Brunner | 348/231.99 |
| 2012/0105672 A1* | 5/2012 | Doepke | H04N 5/2353 348/229.1 |
| 2012/0249844 A1* | 10/2012 | Saito | H04N 5/2355 348/242 |
| 2012/0262600 A1* | 10/2012 | Velarde | H04N 5/2355 348/223.1 |
| 2013/0208139 A1* | 8/2013 | Lin | G06T 5/40 348/229.1 |
| 2015/0110356 A1* | 4/2015 | Qian | G06K 9/00624 382/103 |

FOREIGN PATENT DOCUMENTS

| | | |
|---|---|---|
| EP | 1052848 A1 | 11/2000 |
| EP | 1821523 A2 | 8/2007 |
| EP | 2131573 A1 | 12/2009 |
| JP | 10210353 A | 8/1998 |
| JP | 2001016469 A | 1/2001 |
| JP | 3639627 | 1/2005 |

OTHER PUBLICATIONS

Sony a33 a55 Instruction Manual. 2010. http://www.sony.net pp. 1-203.

Heather Kelly: "What HDR means for iPhone photos," Macworld, Sep. 2, 2010 (Sep. 2, 2010), p. 1, XP002660945, Retrieved from the Internet: URL:http://www.macworld.com/article/153850/2010/09/hdrontheiphone.html [retrieved on Oct. 7, 2011].

Christian Zibreg: "HDR camera enabler allows HDR photography on iPhone 3GS and 3G," Geek.com, Sep. 16, 2010 (Sep. 16, 2010), pp. 1-6, XP002660946, Retrieved from the Internet: URL:http://www.geek.com/articles/mobile/hdr-camera-enabler-allows-hdr-photography-on-iphone-3gs-and-3g-20100916/ [retrieved on Oct. 7, 2011].

International Search Report received in corresponding PCT Application No. PCT/US2011/051704, dated Feb. 15, 2012.

* cited by examiner

HIGH DYNAMIC RANGE TRANSITION

BACKGROUND

Today, many personal electronic devices come equipped with digital cameras. Illustrative personal electronic devices include, but are not limited to, mobile phones, personal data assistants, portable music players, and laptop/desktop/tablet computers. Image sensors used in these types of devices often have small dynamic ranges. That is, their ability to capture a range of light from total darkness to full sunlight is limited.

One technique to overcome the limited dynamic range of such cameras is known as High Dynamic Range Imaging (HDRI). The most common HDRI method is known as the multiple exposure technique. Using this approach, the same scene is photographed multiple times at different exposures/apertures with the multiple collected images being merged into a single image. As will be appreciated by those of ordinary skill in the art of image processing, the resulting image can have a wider dynamic range than the underlying camera can provide to any single image. In general, HDRI photography typically works well in outdoor settings, or settings in which there is a wide range of light and/or color.

HDRI capability has recently been introduced into some Digital Single Lens Reflex (DSLR) cameras. These cameras often provide the capability to manually control many image capture parameters such as, for example, focus, shutter speed and aperture. It is possible in some of these cameras to also preset the image capture parameters used during HDRI mode operations (e.g., change in f-stop). That is, if an HDRI mode captures 3 images, a user may set one image to be taken at +1 f-stop and another to be taken at −1 f-stop relative to the f-stop at which a first image is captured. Once manually set and after the camera has been manually placed into the HDRI mode, the settings will be used to automatically capture the designated number of images.

The ability to use HDRI capture techniques can be especially important for cameras included in personal electronic devices because their image sensors generally provide limited dynamic range. Recognition of this fact has led to the introduction of HDRI capability in some personal electronic devices. Unfortunately, there has been no means to automatically determine when HDRI operations can benefit users of these devices. DSLR camera users make that determination themselves based on photographic experience and, possibly, artistic desires. Most users of camera's included in personal electronic devices lack this experience. Accordingly, there is a need for systems, methods, and computer readable medium for automatically determining when scene capture may benefit from HDRI techniques based on the dynamic range of a camera's image sensor.

SUMMARY

The use of High Dynamic Range Imaging (HDRI) techniques may be used to improve the quality of digital images by increasing an image's dynamic range. Such techniques can be especially beneficial in devices whose image capture sensors have an inherently low dynamic range. While the knowledge of when to use HDRI may be learned, many users of personal electronic devices such as mobile phones, personal data assistants, portable music players, and laptop/desktop/tablet computers do not posses such knowledge. Embodiments disclosed herein describe how an initial image's histogram information may be analyzed to automatically determine when HDRI operations can benefit scene capture. If such a determination is made, the user may be so notified.

In one embodiment a first image from an image sensor is captured and its histogram data is obtained (e.g., luminosity and/or color histogram data). The histogram may be analyzed to determine if the image exhibits bright and/or dark blowouts. (That is, areas in the image where pixel brightness (darkness) exceeds the sensor's dynamic range of capturing capability, thus losing information in those areas of the image and producing only pure white (black) pixels.) If either type of blowout is indicated, the user may be notified that HDRI operations can improve image capture. If the user elects HDRI operations, one or more additional images (e.g., a total of 2, 3 or 5 images) may be captured—each image captured using different exposure values (e.g., different f-stop). The multiple captured images may then be combined in accordance with known techniques to produce a final image.

In another embodiment, image histogram data is analyzed by aggregating one or more bins from a first region of the histogram to obtain a first value (e.g., a dark level derived from the "nth" lowest bins in the histogram) and comparing the obtained value against a first threshold. If the threshold is exceeded, the user is given an indication (e.g., a visual and/or auditory signal) that HDRI operations can benefit image capture. If the first threshold is not exceeded, one or more bins from a second region of the histogram (e.g., a bright level derived from the "nth" highest bins in the histogram) may be aggregated to obtain a second value. The second value may be compared to a second threshold and, if exceeded, the user may be given an indication that HDRI operations can benefit image capture.

Devices and program storage devices incorporating the disclosed methods are also described.

DETAILED DESCRIPTION

This disclosure pertains to systems, methods, and computer readable media for determining when image capture operations may benefit from using High Dynamic Range Imaging (HDRI). In general, techniques are disclosed herein for analyzing an image's luminosity and/or color histograms to automatically determine when HDRI can benefit scene capture. If the determination that HDRI operations can improve scene capture, the user is so notified.

In the following description, for purposes of explanation numerous specific details are set forth in order to provide a thorough understanding of the inventive concept. As part of the this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the image processing field having the benefit of this disclosure.

Figure 1:
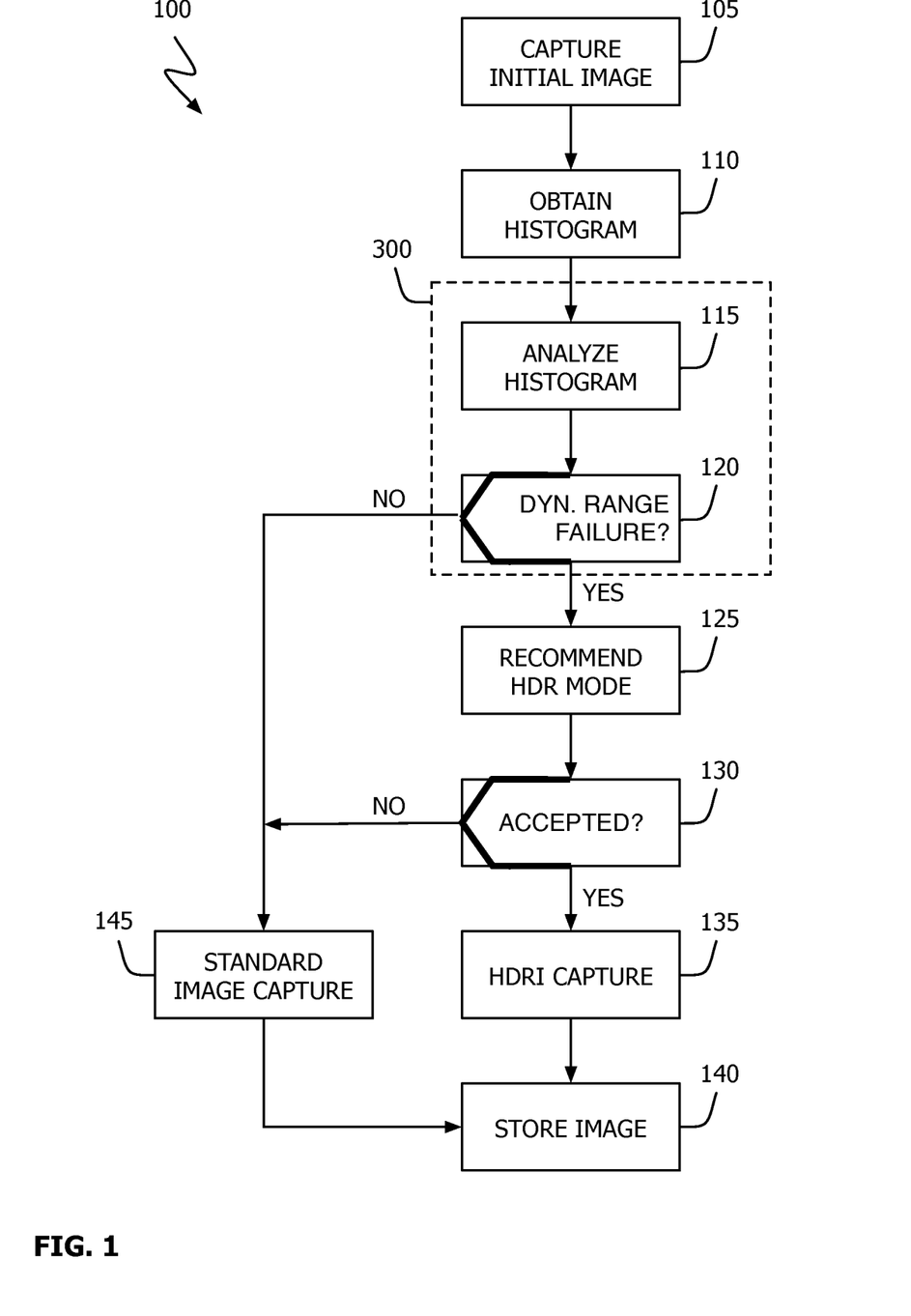
FIG. 1 shows, in flowchart form, an image capture process in accordance with one embodiment.
Figure 2:
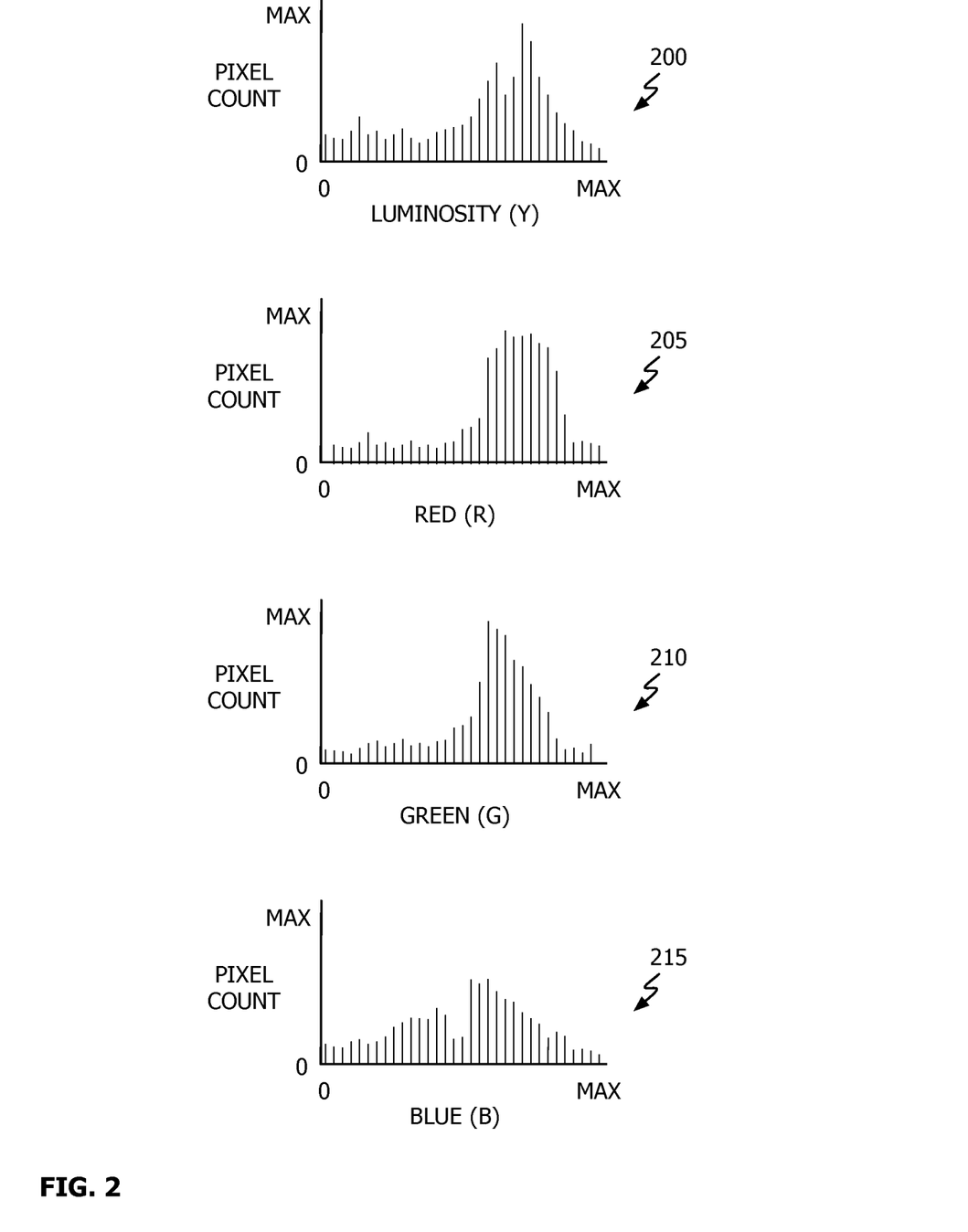
FIG. 2 shows illustrative histograms for a well-balanced image.

Referring to FIG. 1, image capture sequence 100 in accordance with one embodiment begins with the capture of an initial image (block 105). This can, for example, be the "preview" image presented to a camera user via a display screen. Once captured, histogram data is obtained (block 110). As well be recognized, each captured digital image has associated with it metadata. This metadata can include, for example, auto-exposure setting information and image histogram data. An image histogram is a type of histogram that acts as a graphical representation of the luminance and/or tonal (color) distribution in its associated image. A typical set of histograms for a well balanced image is shown in FIG. 2. In this particular example, the digital camera provides four (4) histograms. One each for luminance (200), red (205), green (210) and blue (215) chroma. The abscissa (horizontal axis) of each histogram represents the luminance/tonal variations within the image, while the ordinate (vertical axis) represents the number of pixels at a particular luminance/tone. Thus, the left side of the abscissa represents the black or dark areas, the middle represents medium grey and the right hand side represents light or pure white/color areas. It will be recognized that not all digital cameras provide all four of the illustrative histograms. Some cameras, for example, may provide only two histograms: luminance and a combined red-green-blue histogram. Other cameras may operate in the $YC_BC_R$ color space and provide luminance and $C_B$ and $C_R$ histograms.

Referring again to FIG. 1, an analysis of one or more of the obtained histograms may then be performed (block 115) to determine if the scene's dynamic range (i.e., spread of light from dark to bright) exceeds that of the camera's image sensor (block 120). (Actions in accordance with blocks 115 and 120 collectively are denoted as 300 and are discussed below with respect to FIG. 3.) If it is determined that the image sensor's dynamic range has been exceeded (the "YES" prong of block 120), an indication to the user may be provided to indicate HDRI operations may be beneficial (block 125). In one embodiment, a flashing icon in the camera's display screen may be used to indicate that the current scene may benefit form HDRI operations. In another embodiment, a message may be presented to the user via the camera's display. In still another embodiment, a tone may sound. In yet another embodiment, both a tone and a visual indication may be presented. If the user accepts the recommendation (the "YES" prong of block 130), HDRI operations are instituted for the current image (block 135), whereafter the captured image may be stored (block 140). One of ordinary skill in the art will appreciate that HDRI operations in accordance with block 135 includes (1) the capture of multiple images, (2) the alignment of those images and (3) the merging of the multiple images into a final image. There are many known techniques to accomplish these operations—any of which may be used in accordance with image capture sequence 100.

If it is determined that the image sensor's dynamic range has not been exceeded (the "NO" prong of block 120) or the user elects not to enter HDRI mode (the "NO" prong of block 130), the scene is captured in accordance with the camera's current non-HDRI settings (block 145), after which the image may stored for later use (block 140).

Figure 3:
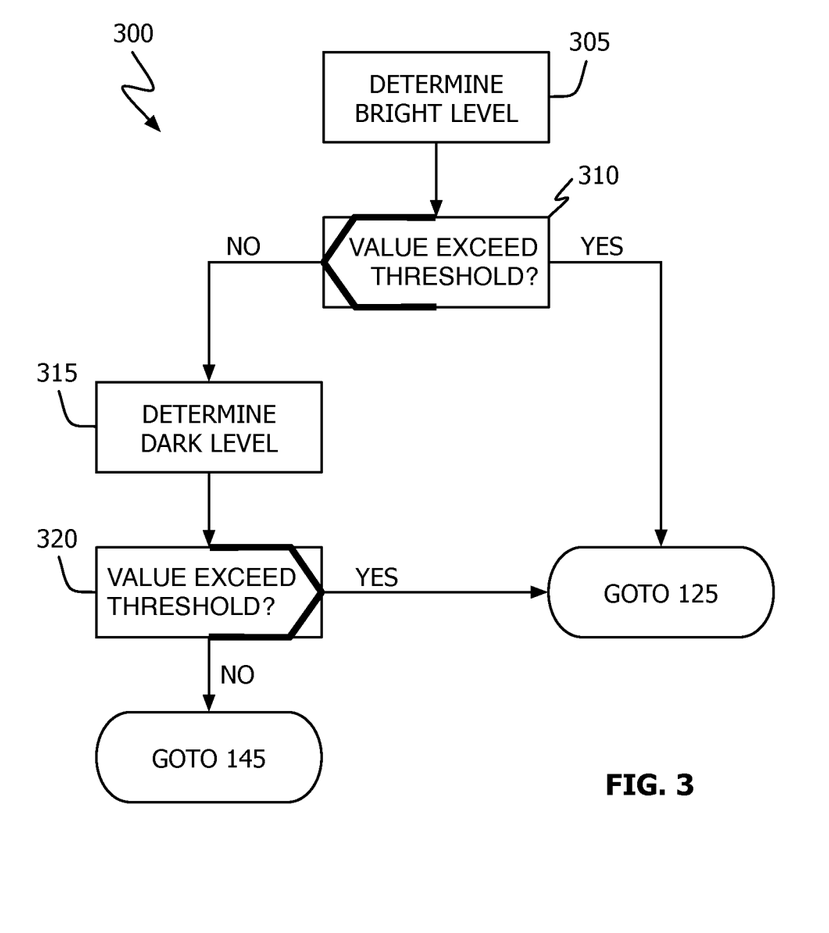
FIG. 3 shows, in flowchart form, image analysis operations in accordance with one embodiment.

Referring to FIG. 3, actions 300 begin by analyzing the histogram(s) to determine the image's "brightness level" (block 305). The determined brightness level is then compared against a first threshold (block 310). If the first threshold is exceeded (the "YES" prong of block 310), operations continue at block 125 in FIG. 1 (wherein HDRI operations are recommended). When the brightness level determined in accordance with block 310 is exceeded, it indicates the image has bright blowouts—areas in the image where pixel brightness exceeds the sensor's ability to capture bright light (i.e., the sensor's dynamic range is exceeded). If the first threshold is not exceeded (the "NO" prong of block 310), an analysis of the histogram(s) is performed to determine the image's "darkness level" (block 315). The determined darkness level is then compared against a second threshold (block 320). If the second threshold is exceeded (the "YES" prong of block 320), operations continue at block 125. When the darkness level determined in accordance with block 315 is exceeded, it indicates the image has dark blowouts—areas in the image where pixel darkness exceeds the sensor's ability to capture dark light (i.e., the sensor's dynamic range is exceeded). If the second threshold is not exceeded (the "NO" prong of block 320), operations continue at block 145 in FIG. 1 (wherein non-HDRI capture operations are performed).

In some situations, blowouts may occur as a result of an intentional artistic choice of the photographer, or they may be an accurate depiction of areas of extreme brightness/darkness in the scene, such as the reflection of the sun off the surface of a body of water (specular highlights) or particularly dark shadows. In these cases, the loss of detail in the blown out areas may be intentional, tolerable, or even appropriate. However, in other situations, the photographer may want a detailed image (i.e., without blown out areas). In such cases, a digital image capture device operated in accordance with FIGS. 1 and 3 can indicate to the user blowouts exist and that they may be mitigated by entering an HDRI operating mode.

In one embodiment, actions in accordance with blocks 305 and 315 analyze an image's luminance histogram. To determine the brightness level, for example, the number of pixels in a specified number of histogram bins at or near the maximum brightness are determined. Similarly, to determine the darkness level the number of pixels in a specified number of histogram bins at or near the minimum brightness are determined. The number of histogram bins to aggregate is dependent, at least in part, on the image sensor's noise level. For example, if the image sensor had no inherent noise the brightness (darkness) level may be determined by counting the number of pixels in the histogram's highest (lowest) bin. Because all image sensors inherently exhibit some noise, it has been found beneficial to aggregate a number of bins when determining the brightness and darkness levels. For example, in a digital imaging device having 8-bit luminance data, the brightness level may be determined by aggregating the pixel counts in the top four bins (e.g., bins 252-255). Similarly, the darkness level may be determined by aggregating the pixel counts in the bottom four bins (e.g., bins 0-3). It will be recognized that determination of the brightness and darkness levels in accordance with blocks 305 and 315 need not aggregate the same number of bins. For example, if an image sensor exhibits more noise in the lower luminance region than in the high luminance region, the number of bins aggregated when determining the darkness level may be greater than the number of bins aggregated to find the brightness level. Accordingly, the number of bins to aggregate is selected to ensure that the value obtained includes enough bins to accurately reflect the existence of a blowout area and not image sensor noise.

In one embodiment, actions in accordance with blocks 310 and 320 compare the determined brightness and darkness level values with specified bright and dark thresholds. While the number of bins used to calculate brightness and darkness levels may be based on a consideration of the image sensor's characteristics (e.g., noise), bright and dark thresholds tend to be more subjective, being based at last in part on desired characteristics of the resulting images. For example, if the capture of specular highlights is more important than guarding against the occasional over exposed area within a scene, then the bright threshold may be set higher than if guarding against over-exposing a scene were more important that capturing specular highlights. In like fashion, if it is more important to permit dark blowouts (e.g., for artistic purposes) than guarding against the occasional under-exposed area within a scene, then the dark threshold may be set higher than if guarding against under-exposure were more important. Accordingly, bright and dark thresholds may be determined empirically and may be based on the desired function of the image capture device. In one embodiment, both the bright and dark thresholds may be set at 15% of the total number of pixels in the image capture device's sensor. In another embodiment, the threshold may be set at a specified number of pixels. In still another embodiment, the bright and dark thresholds are different (e.g., 15% for the bright threshold and 12% for the dark threshold). In yet another embodiment, the number of bins selected to aggregate could be done dynamically depending upon the scene capture characteristics and/or other features of the digital image capture device. In still another embodiment, the number of bins aggregated may be based on the "type" of image being captured. For example, "outdoor," "portrait" or "fireworks" modes.

Figure 4:
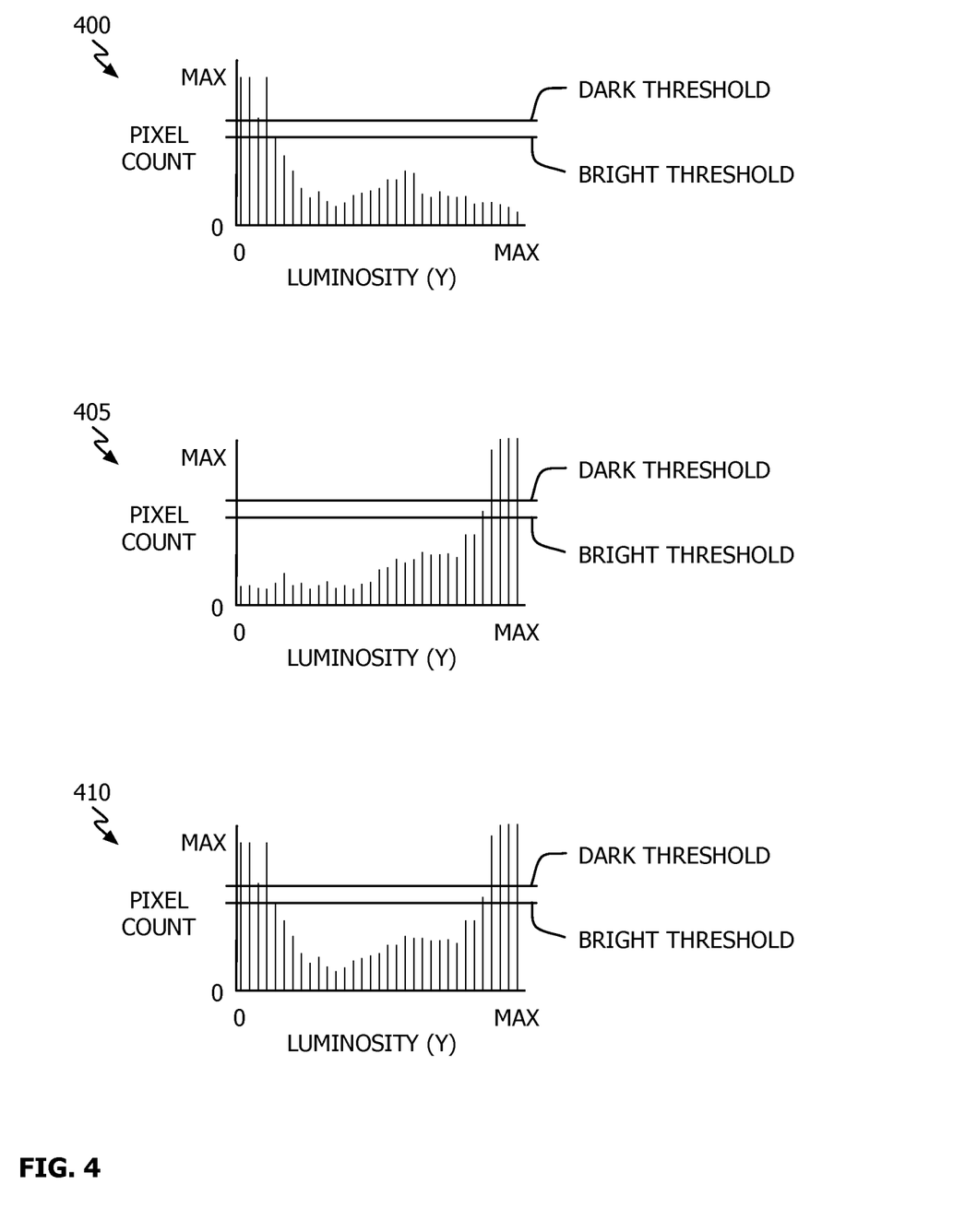
FIG. 4 shows illustrative histograms and associated image bright and dark thresholds in accordance with one embodiment.

By way of example, consider FIG. 4. In the case where an image's luminosity histogram is used to determine if HDRI is appropriate and, further, where the bright and dark thresholds are different, 400 shows an image where a dark blowout is indicated. In 405, a bright blowout is indicated and in 410 both a dark and bright blowout are indicated. In each of these cases, image capture operations in accordance with FIG. 1 may recommend that HDRI mode be entered (e.g., at block 125).

Figure 5:
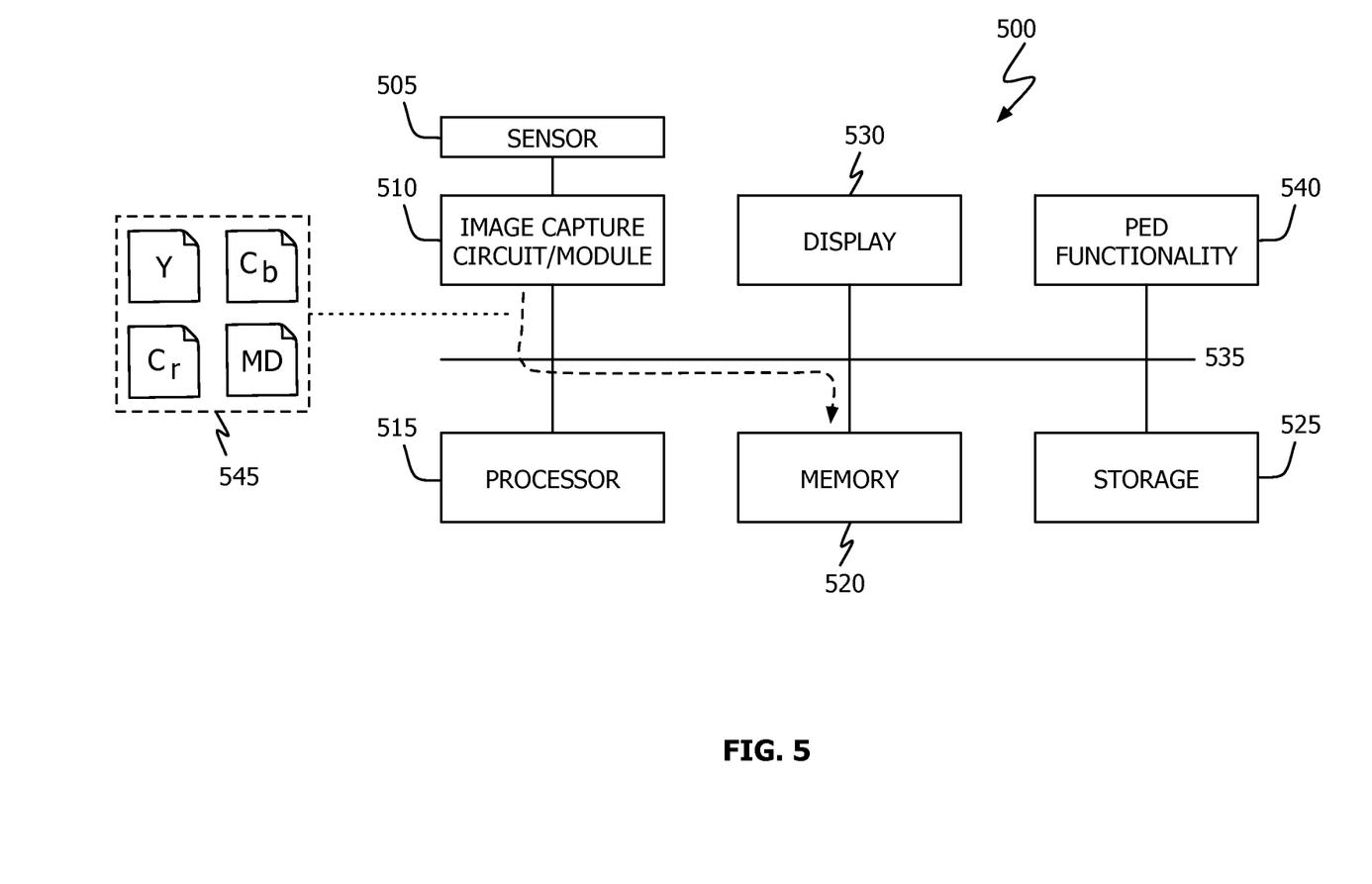
FIG. 5 shows, in block diagram form, a personal electronic device in accordance with one embodiment.

Referring now to FIG. 5, a simplified functional block diagram of illustrative personal electronic device 500 includes digital image capture sensor 505, image capture and processing circuit/module 510, programmable control processor 515 (aka, "processor"), memory 520, storage 525, display 530 and bus 535 (through which the other elements are communicatively coupled). Device 500 may also include circuits 540 to provide additional functionality. For example, if device 500 were a mobile phone, circuitry 540 would include phone functionality. Similarly, if device 500 were a personal music device, circuitry 540 would include music storage, display and playback functionality.

As well be recognized by those of ordinary skill in the art, image capture and processing circuit/module 510 may include the necessary capability to process image data received from sensor 505 and send partially processed image data 545—e.g., luminosity (Y) histogram data, color histogram data ($C_b$, $C_r$) and other metadata such as image exposure settings (MD)—to memory 520. Once in memory 520, processor 515 can access/obtain the necessary histogram data and perform acts in accordance with FIGS. 1 and 3.

By way of example, consider image capture process 100 (see FIG. 1) as may be performed by device 500. During normal operation a user may point their camera (e.g., device 500 incorporating sensor 505 and image capture circuit/module 510) at a scene. As part of this process a preview image may be captured (Image-1) and its histogram and other metadata sent to memory 515 (block 105). Processor 515 may then obtain Image-1's histogram data from memory 520 (block 110) and analyze it in accordance with blocks 115 and 120 (see also FIG. 3). If it is determined that Image-1 may benefit from HDRI operations, the user would be so notified (block 125). Should the user accept the recommendation (the "YES" prong of block 130), additional images may be obtained when the user captures the scene (block 135). For example, the user may touch display 530 at a designated location or depress a button or switch on device 500. In one embodiment a total of three images may be obtained: Image-1, Image-2 and Image-3 where Image-2 and Image-3 are automatically captured using different exposure settings from that used to capture Image-1 (e.g., +1 f-stop and −1 f-stop). Image data for Image-2 and Image-3 are stored in memory 520 whereafter processor 515 may combine all three of the images in any desired fashion to produce a final image (block 135). The final image may be placed into storage 525 for later use (block 140). It will be recognized that the number of images captured and combined during acts in accordance with block 135 are not limited to 3. For example, in one embodiment only one additional image is captured (e.g., Image-2 or Image-3). In another embodiment, 5 images total are captured. The number of images automatically captured using different exposure settings is a design decision dependent upon, inter alia, the type of device 500, the computational power of processor 515, the bandwidth of bus 535 and the capacity of memories 520 and 525.

Various changes in the materials, components, circuit elements, as well as in the details of the illustrated operational methods are possible without departing from the scope of the following claims. For instance, operations in accordance with FIG. 3 may be altered to determine if the device's dark threshold is exceeded first. In addition, embodiments of the described inventive concept are not limited to using luminosity data. As previously noted, tonal data may also be used (alone or in conjunction with luminosity information). Further, gain and exposure settings are not the only image capture settings that may be altered in accordance with block 135.

Acts in accordance with FIGS. 1 and 3 may be performed by a programmable control device executing instructions organized into one or more program modules and stored in memory (e.g., 520 and/or 525). A programmable control device (e.g., processor 515) may include any programmable controller device including, for example, one or more members of the Intel Atom®, Core®, Pentium® and Celeron® processor families from Intel Corporation and the Cortex and ARM processor families from ARM or custom designed state machines. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Custom designed state machines may be embodied in a hardware device such as application specific integrated circuits (ASICs) and field programmable gate arrays (FPGAs).

Storage devices suitable for tangibly embodying program instructions (e.g., memory 520 and storage 525) include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
    capturing a first image of a scene using an image sensor;
    obtaining a histogram representative of the first image, the histogram having a plurality of bins;
    determining, from the histogram, if the image sensor's dynamic range has been exceeded by:
        receiving an input modifying a previous brightness threshold to a first brightness threshold and an input modifying a previous darkness threshold to a first darkness threshold,
        determining a brightness level of the histogram,
        determining whether the brightness level exceeds the first brightness threshold, and
        determining, if the brightness level does not exceed the first brightness threshold, a darkness level of the histogram; and
    presenting to a user a recommendation to switch from a non-high dynamic range operation to a high dynamic range operation for a subsequent capturing of the scene when it is determined that the image sensor's dynamic range has been exceeded, wherein the recommendation can be accepted or declined by the user.

2. The method of claim 1, further comprising:
    receiving user input to use high dynamic range operations; and
    capturing, automatically, one or more additional images, each additional image captured using different image exposure setting values from those used when capturing the first image.

3. The method of claim 2, further comprising:
    combining the first image and the one or more additional images into a result image; and
    storing the result image in a memory.

4. The method of claim 1, wherein capturing a first image comprises capturing a preview image.

5. The method of claim 1, wherein obtaining a histogram comprises obtaining a luminosity histogram.

6. A program storage device, comprising instructions for causing a programmable control device to perform the method of claim 1.

7. The method of claim 1, wherein the brightness level is determined by:
    counting pixels in a number of histogram bins at the histogram's maximum brightness level, wherein the number of histogram bins is selected based on at least one of sensor noise, capture characteristics, or image type.

8. The method of claim 1, wherein the darkness level is determined by:
    counting pixels in a number of histogram bins at the histogram's maximum darkness level wherein the number of histogram bins is selected based on at least one of sensor noise, capture characteristics, or image type.

9. A digital image capture device, comprising:
    a digital image sensor;
    a memory communicatively coupled to the digital image sensor; and
    a programmable control device communicatively coupled to the memory, wherein the memory includes instructions for causing the programmable control device to perform the method of claim 1.

10. The digital image capture device of claim 9, wherein the digital image sensor, memory and programmable control device are incorporated in a personal electronic device.

11. A method comprising:
    capturing a first image of a scene using an image sensor;
    obtaining a histogram representative of the first image, the histogram having a plurality of bins;
    determining, from the histogram, if the image sensor's dynamic range has been exceeded by:
        determining a brightness level, wherein the brightness level is determined by counting pixels in a number of histogram bins at the histogram's maximum brightness level, wherein the number of histogram bins is selected based on at least one of sensor noise, capture characteristics, or image type,
        determining a darkness level, wherein the darkness level is determined by counting pixels in a number of histogram bins at the histogram's maximum darkness level, wherein the number of histogram bins is selected based on at least one of sensor noise, capture characteristics, and image type, and
    presenting to a user a recommendation to switch from a non-high dynamic range operation to a high dynamic range operation for a subsequent capturing when it is determined that the image sensor's dynamic range has exceeded at least one of a modifiable brightness threshold and a modifiable darkness threshold, wherein the recommendation can be accepted or declined by the user.

12. The method of claim 11, further comprising:
    receiving user input to enter the high dynamic range mode of operating the digital image capture device; and
    capturing, based on the user input one or more additional images, each additional image captured using different exposure setting values from those used when capturing the image.

13. The method of claim 12, further comprising:
    combining the image and the one or more additional images into a result image; and
    storing the result image in the memory.

14. The method of claim 11, wherein receiving a histogram comprises obtaining a luminosity histogram.

15. A program storage device, comprising instructions for causing a programmable control device to perform the method of claim 11.

16. A digital image capture device, comprising:
   a digital image sensor;
   a memory communicatively coupled to the digital image sensor; and
   a programmable control device communicatively coupled to the memory, wherein the memory includes instructions for causing the programmable control device to perform the method of claim 11.

17. The digital image capture device of claim 16, wherein the digital image sensor, memory and programmable control device are incorporated in a personal electronic device.

18. The digital image capture device of claim 17 wherein the personal electronic device comprises a mobile phone.

19. The method of claim 11, wherein determining, from the histogram, if the image sensor's dynamic range has been exceeded further comprises:
   receiving an input setting a brightness threshold and an input setting a darkness threshold;
   determining whether the brightness level exceeds the brightness threshold; and
   determining, if the brightness level does not exceed the brightness threshold, whether the darkness level exceeds the darkness threshold.

* * * * *